(12) United States Patent
Volobuev (10) Patent No.: US 8,732,394 B2
(45) Date of Patent: May 20, 2014

(54) ADVANCED DISK DRIVE POWER MANAGEMENT BASED ON MAXIMUM SYSTEM THROUGHPUT

(75) Inventor: Yuri L. Volobuev, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 12/647,339

(22) Filed: Dec. 24, 2009

(65) Prior Publication Data

US 2011/0161582 A1 Jun. 30, 2011

(51) Int. Cl.
*G06F 12/00* (2006.01)
*G06F 3/06* (2006.01)

(52) U.S. Cl.
CPC ............ *G06F 3/0613* (2013.01); *G06F 3/0634* (2013.01); *G06F 3/0629* (2013.01)
USPC .......................................... 711/112; 713/324

(58) Field of Classification Search
CPC ... G06F 3/0613; G06F 3/0629; G06F 3/0626; G06F 3/0634
USPC .................. 711/165, 114, 112, E12.001, 167; 713/324, 320
See application file for complete search history.

(56) References Cited

U.S. PATENT DOCUMENTS

| | | | |
|---|---|---|---|
| 6,311,251 B1 | 10/2001 | Merritt et al. | |
| 6,496,899 B1 * | 12/2002 | DeMoney | 711/112 |
| 7,089,359 B2 | 8/2006 | Kaneda et al. | |
| 7,143,433 B1 * | 11/2006 | Duan et al. | 711/114 |
| 8,006,111 B1 * | 8/2011 | Faibish et al. | 713/324 |
| 2005/0111249 A1 | 5/2005 | Yagisawa et al. | |
| 2008/0172525 A1 | 7/2008 | Nakamura et al. | |
| 2009/0240992 A1 | 9/2009 | Ishii et al. | |

FOREIGN PATENT DOCUMENTS

| | | |
|---|---|---|
| EP | 1895396 A2 | 3/2008 |
| EP | 2026185 A2 | 2/2009 |
| JP | 2005063591 | 3/2005 |

OTHER PUBLICATIONS

International Searching Authority, International Search Report, Feb. 18, 2011.

* cited by examiner

*Primary Examiner* — Pierre-Michel Bataille
(74) *Attorney, Agent, or Firm* — Matthew B. Talpis; Gregory K. Goshorn; Greg Goshorn, P.C.

(57) ABSTRACT

The disclosed technology identifies bottlenecks in a hierarchical storage subsystem and, based upon the rate at which data may be transmitted through a particular bottleneck, determines the smallest number of disk drives required to match that transmission rate. If the required number of disks is less than the total number of disks, only a subset of the total number are maintained in an active state with the remainder places in either a "standby" or "off" mode. In this manner, overall system power consumption is reduced. In one embodiment, the disclosed techniques are implemented by active disk management at high level of storage infrastructure.

25 Claims, 5 Drawing Sheets

ADVANCED DISK DRIVE POWER MANAGEMENT BASED ON MAXIMUM SYSTEM THROUGHPUT

SUMMARY

Provided is a method for reducing power consumption in a computer system by identifying subsets of storage devices that may be placed in a standby configuration. In a modern computer system, storage subsystems are typically implemented in a hierarchical manner. For example, before user data is transmitted to or retrieved from a disk device, the data must pass through several layers of software and hardware. This is particularly true with respect to enterprise data centers. In a typical configuration in which data is stored on a network file server, a data packet may pass through the following layers:
  1) Network connection between a network client and a server;
  2) Layer of software providing network file services (e.g. Network file system or "NFS");
  3) File system layer;
  4) Logical volume manager (LVM) layer;
  5) File server hardware and the connection to a disk controller; and
  6) Disk drive attached to a disk controller.

Of course, the number of software and hardware layers can vary depending upon a particular configuration. For example, some configuration may also include a storage area network (SAN). However, many modern storage subsystems include hierarchical levels of abstraction and aggregations of multiple storage resources. For example, a disk controller may aggregate several physical disks into a logical array and a LVM or file system layer may further aggregate logical disk arrays into a higher-level abstraction.

One embodiment of the claimed invention involves evaluating data throughput of a computing system to generate a data storage requirement; generating, based upon the data storage requirement, an active disk list, wherein a selection of data storage devices of a plurality of data storage devices specified on the active disk list is sufficient to meet the data storage requirement; ensuring that each particular data storage device specified in the active disk list is active and that any data storage device not specified on the active disk list is inactive; re-evaluating, during operation of the computing system, data throughput of the computing system to generate a modified data storage requirement; generating a modified active disk list based upon changed the modified data storage requirement, wherein a modified selection of data storage devices of the plurality of data storage devices specified on the modified active disk list is sufficient to meet the modified data storage requirement; and ensuring that each particular data storage device listed on the modified active disk list is active and that any data storage device not listed on the modified active disk list is inactive.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for power management in a data storage subsystem. The term "programmed method", as used herein, is defined to mean one or more process steps that are presently performed; or, alternatively, one or more process steps that are enabled to be performed at a future point in time. The term "programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the Inventors have herein had recognized, while hierarchical levels of abstraction and aggregations of multiple storage resources provide for a higher level of flexibility in the provisioning of available data storage space, inefficiencies are also created, one of which is a lack of active disk power management.

It is common for a "disk farm" to include a large number of physical disks, disk controllers and file server nodes to provide a necessary amount of storage space and meet a specific required level of performance. Typically, in such a configuration, all physical disks are powered and spinning at a maximum speed supported by the disk, regardless of the actual storage system workload. Such usage consumes a large amount of power and generates a commensurate amount of heat. In an environment with a large number of disk drives, issues related to overall power consumption and heat dissipation present a challenge. In addition, maintaining a disk drive in a full-power, full-speed state may shorten the life span of the drive.

The disclosed technology identifies bottlenecks in a hierarchical storage subsystem and, based upon the rate at which data may be transmitted through a particular bottleneck, determines the smallest number of disk drives required to match that transmission rate. If the required number of disks is less than the total number of disks, only a subset of the total number are maintained in an active state with the remainder placed in either a "standby" or "off" mode. In this manner, overall system power consumption is reduced. In one embodiment, the disclosed techniques are implemented by active disk management at high level of storage infrastructure.

Figure 1:
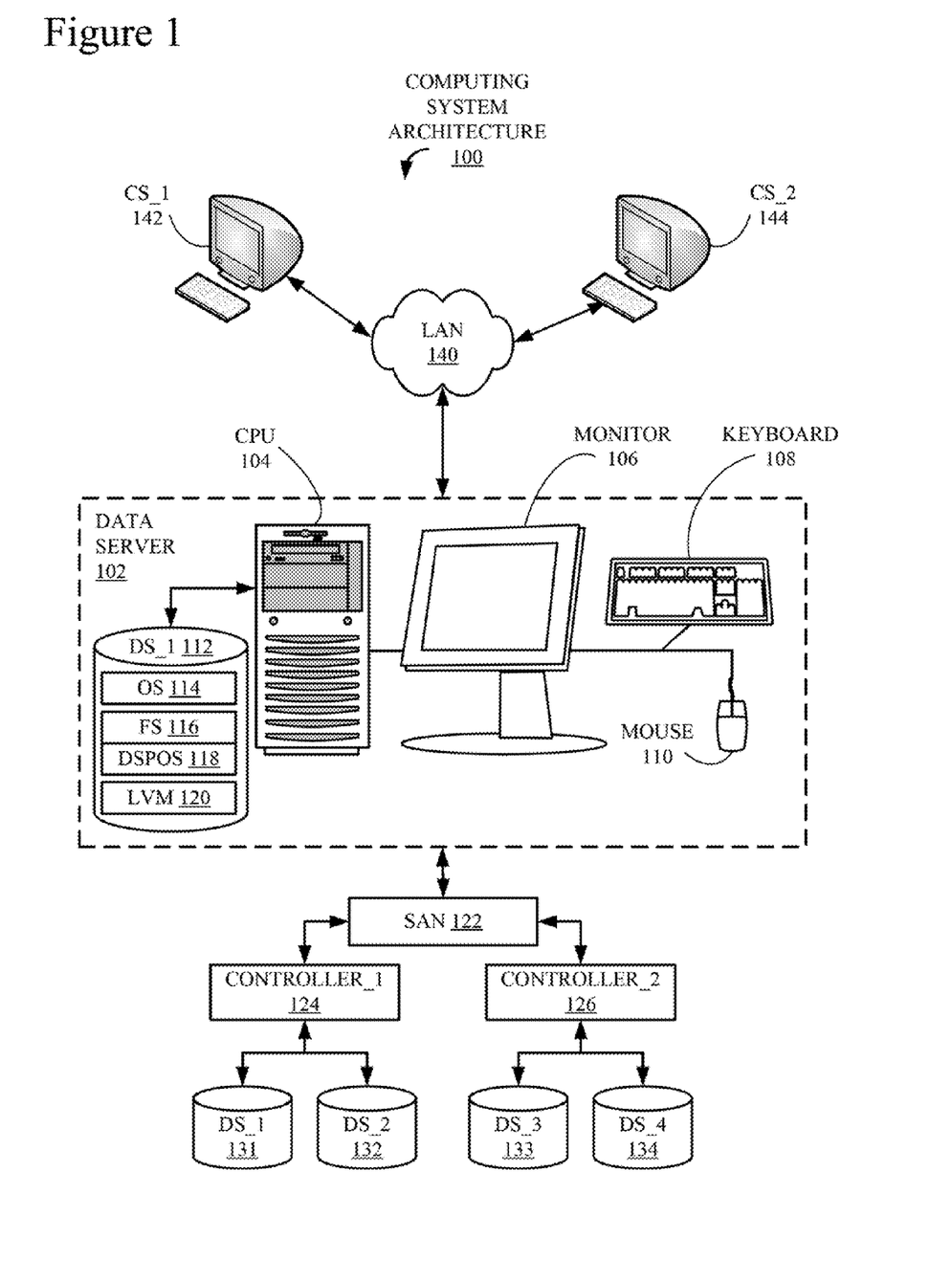
FIG. 1 is a block diagram of one example of a computing system architecture that may implement the claimed subject matter.

Turning now to the figures, FIG. 1 is a block diagram of one example of a computing system architecture 100 in which the disclosed technology may be implemented. A data server, 102 includes a central processing unit (CPU) 104, coupled to a monitor 106, a keyboard 108 and a mouse 110, which together facilitate human interaction with computing system 100 and data server 102. CPU 104 would typically include one or more processors (not shown) and other components, such as but not limited to a data cache (not shown) and a data bus (not shown), which should be familiar to those with skill in the computing arts. A data storage component, or DS_1, 112, is also included in data server 102 and attached to CPU 104. DS_1 112 may either be incorporated into CPU 104 i.e. an internal device, or attached externally to CPU 104 by means of various, commonly available connection devices such as but not limited to, a universal serial bus (USB) port (not shown). DS_1 112 is illustrated storing an operating system (OS) 114 and a file system (FS) 116, which may be incorporated into OS 114, a data storage power optimization system (DSPOS) 118, which may be part of FS 116 and a logical volume management (LVM) component 120. DSPOS 118, which is an example of a device that may implement the claimed subject matter, is described in more detail below in conjunction with FIGS. 2-5.

Data server 102 is communicatively coupled to a storage area network (SAN) 122, which is coupled to a number of disk controllers, i.e. a controller_1 124 and a controller_2 126. Each disk controller is coupled to a number of storage devices, i.e. controller_1 124 is coupled to a data storage_1 (DS_1) 131 and a DS_2 132 and controller_2 126 is coupled to a DS_3 133 and a DS_4 134. It should be understood that the components 122, 124, 126 and 131-134 are used for illustrative purposes only. A typical data server may be coupled to multiple SANs and a large number of controllers and data storage devices. For the sake of simplicity, only one (1) SAN, two (2) controllers and four (4) data storage devices are illustrated. In addition, one with skill in the art should appreciate that the disclosed technology is equally applicable to other types of components and configurations.

Also illustrated are a first client system, or CS_1, 142, and a second client system, or CS_2 144, both of which, like data server 102 would typically include components like CPU 104, monitor 106, a keyboard 108, mouse 110 and data storage 112. Both CS_1 142 and CS_2 144 are communicatively coupled to a local area network (LAN) 140, which is coupled to file server 102. LAN 140 is used for the purposes of illustration only and it should be understood that CS_1 142, CS_2 144 and file server 102 could also be connected by direct connections or other types of networks such as a virtual private network (VPN), a wide area network (WAN), the Internet or some combination of networks and other connections. CS_1 142 and CS_2 144 are used throughout the Specification as examples of devices that may access the services of data server 102.

It should be understood that there may be other clients, servers and communication devices incorporated into architecture 100 that may incorporate the claimed technology other than the few devices illustrated. Further, it should be noted there are many possible computing system configurations, of which computing system architecture 100 is only one simple example used for illustrative purposes.

Figure 2:
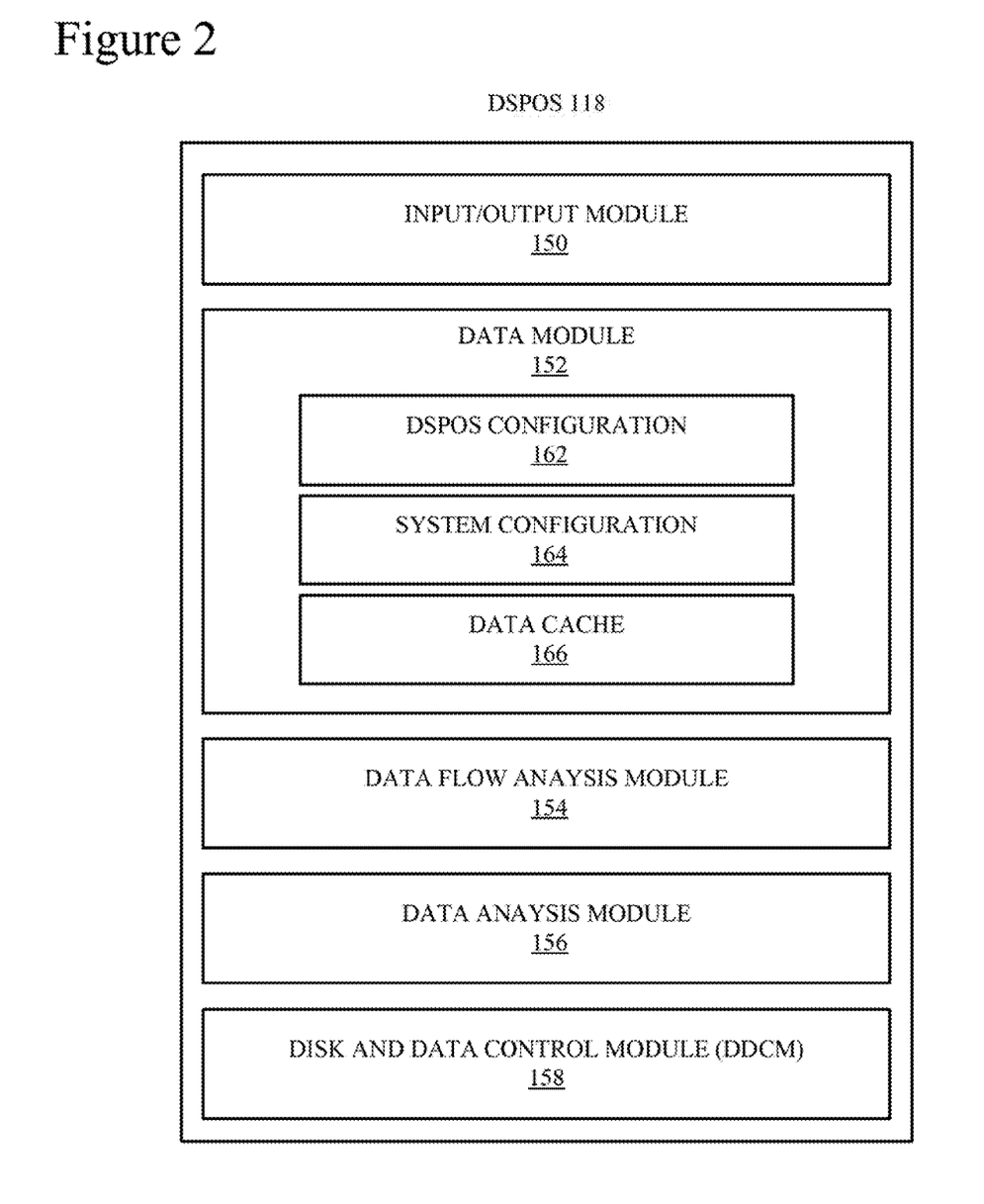
FIG. 2 is a block diagram a data storage power optimization system (DSPOS) that implements one embodiment of the claimed subject matter.

FIG. 2 is a block diagram DSPOS 118, first introduced above in conjunction with FIG. 1, in more detail. DSPOS 118 includes an input/output (I/O) module 150, a data module 152, a data flow analysis module 154, a data analysis module 156 and a disk and data control module 158. For the sake of the following examples, DSPOS 118 is assumed to be stored on DS_1 112 of data server 102 and executed on one or more processors associated with CPU 104. Although illustrated as a stand-alone component, DSPOS 118 may be implemented as functionality of FS 116 (FIG. 1) and/or OS 114.

It should be understood that the claimed subject matter can be implemented in many types of computing systems and data storage structures but, for the sake of simplicity, is described only in terms of server 102 and system architecture 100 (FIG. 1). Further, the representation of DSPOS 118 in FIG. 2 is a logical model. In other words, components 150, 152, 154, 156 and 158 may be stored in the same or separates files and loaded and/or executed within data server 102 and system 100 either as a single system or as separate processes interacting via any available inter process communication (IPC) techniques.

I/O module 150 handles any communication DSPOS 118 has with other components of data server 102 and system 100. Data module 152 is a data repository for information, including settings and parameters that DSPOS 118 requires during normal operation. Examples of the types of information stored in data module 152 include a DSPOS configuration module 162, a system configuration module 164 and a data cache 166. DSPOS configuration 162 stores the parameters and other information that control the operation of DSPOS 118. Examples of the types of information, include, but are not limited to:

1) Selection of various data storage control schemes;
2) Minimum number of disks to keep powered;
3) Schemes to control the timing of moving disks in and out of use; and
4) Performance parameters for the system as a whole.

System configuration 164 stores information on the various components of system 100, including those that impact the operation of DSPOS 118 and those that are controlled by DSPOS 118. Examples of the types of information, include, but are not limited to:

1) Devices in the system;
2) Hierarchy of devices with the system;
3) Status and configuration of devices in the system;
4) Communication parameters associated with devices;
5) Performance parameters associated with devices;
6) Storage capacity of data storage devices; and
7) Location of particular special data such as metadata.

It should be noted that some of the information listed above might be known and/or gathered by FS 116 and/or OS 114. In addition, information may be gathered dynamically by DSPOS 118, FS 116 and/or OS 114 during operation of system 100 or entered by a system administrator who has knowledge of the performance characteristics of system 100 and the associated components. Data cache 166 stores the results of intermediate calculations associated with the operation of DSPOS 118 and any volatile information employed during the operational activity of DSPOS 118 (see 230, FIG. 4). Examples of volatile information include, but are not limited to, information identifying those data storage devices that are currently active and those that are currently available. Components 150, 152, 154, 156, 158, 162, 164 and 166 are described in more detail below in conjunction with FIGS. 3-5.

Figure 4:
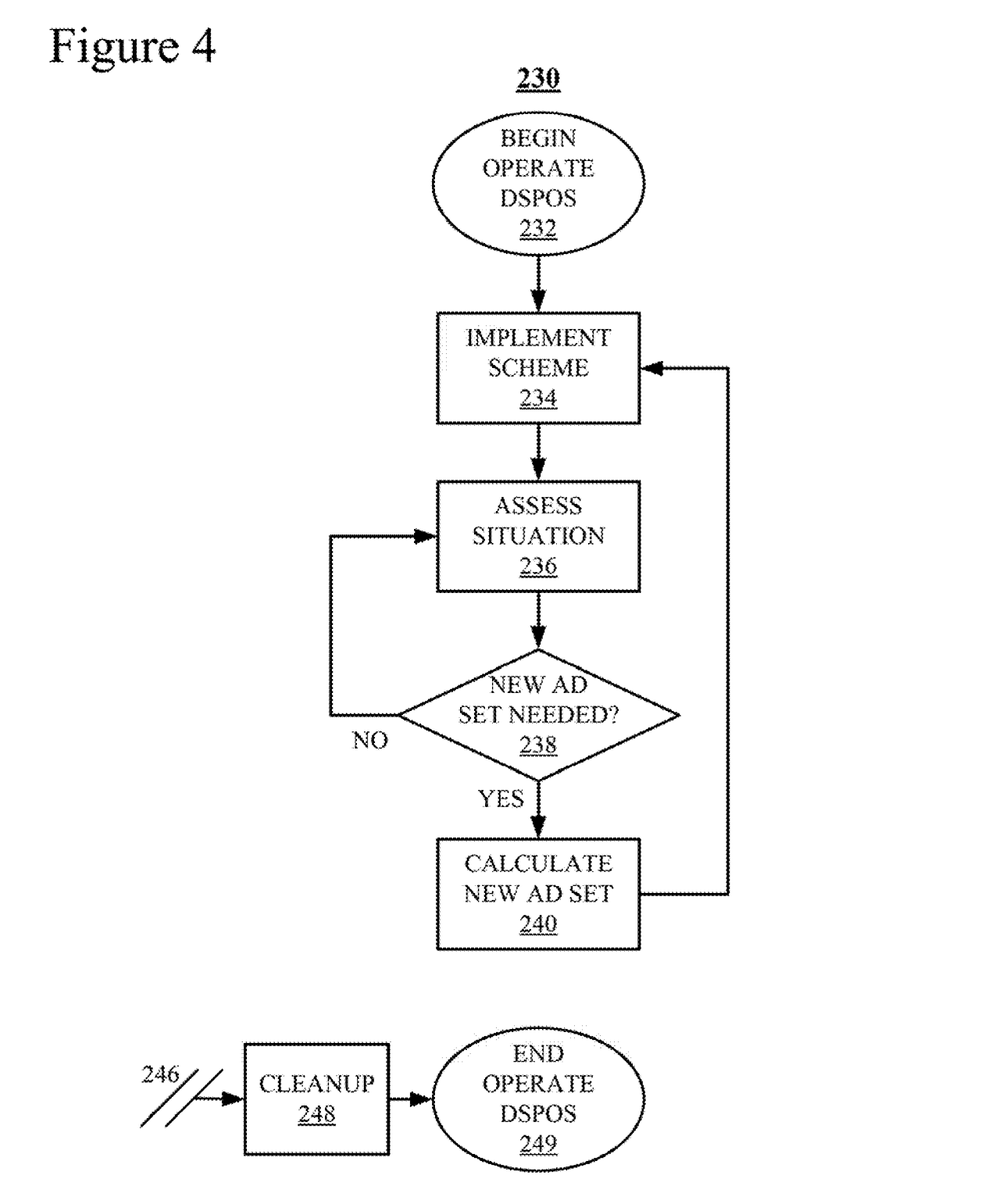
FIG. 4 is a flowchart of an Operate DSPOS process corresponding to the DSPOS of FIG. 2.

Data flow analysis module 154 analyses the activity of data server 102, as well as appropriate components of system 100, to determine the current situation with respect to the movement of data (see 236, FIG. 4). Examples of activities that may be evaluated include, but are not limited to, changes in the level of activity of clients, e.g. CS_1 142 and CS_2 144 (FIG. 1), current system configuration, e.g. network links, disk or disk controllers that are either inoperative or have been added to system 100, workload composition, e.g. ratio of data reads to data writes, and disk space utilization, both inside and outside the active disk set.

Data analysis module 156 analyses the accessibility and character of data stored on data storage devices such as devices 131-134 (FIG. 1). For example, in the event of low system throughput, it may be advantageous to maintain data blocks for each individual file on a small subset of data storage devices. In the event of throughput increases, it may be advantageous to spread data blocks of a particular file over a larger number of disks to facilitate meeting performance targets. In addition, certain types of files may need to be maintained on active data storage devices. For example, metadata, e.g. Modes, indirect blocks, directories, etc., typically occupies significantly less storage space and can therefore be stored in its entirety on a small number of devices. Since metadata access patterns are also typically more random and access delays more disruptive than typical data access patterns and delays, metadata may either be maintained on data storage devices that remain online or be shifted within the system as data storage devices are activated and deactivated.

In a file system with advanced information lifecycle management (ILF) capabilities, ILF information may be leveraged to increase the probability of storing "hot" data blocks on data storage devices scheduled to be online. Data unlikely to be accessed, e.g. data in older snapshots or write-once data, may be stored on or shifted to data storage devices scheduled to be placed in an offline mode.

Figure 3:
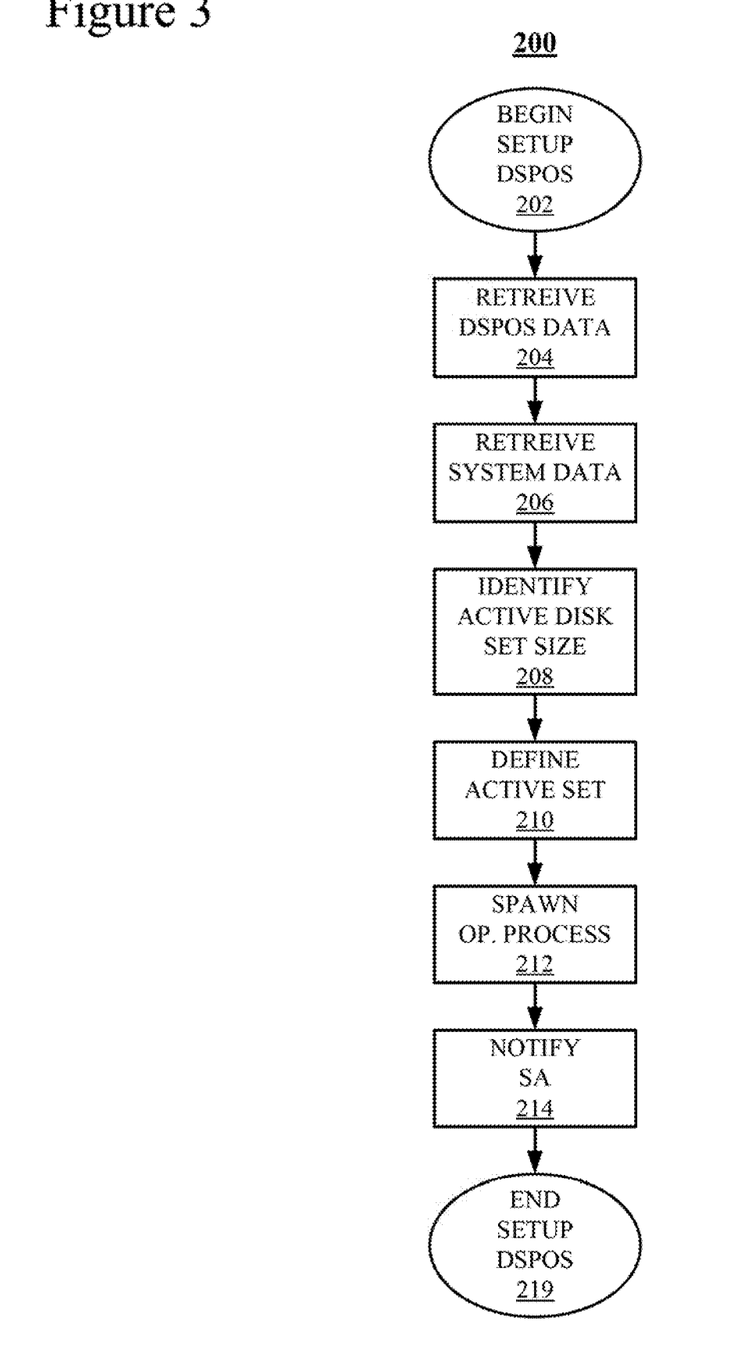
FIG. 3 is a flowchart of a Setup DSPOS process corresponding to the DSPOS of FIG. 2.

FIG. 3 is a flowchart of a Setup DSPOS process 200 corresponding to DSPOS 118 of FIGS. 1 and 2. In this example, logic associated with process 200 is stored on DS_1 112 of data server 102 (FIG. 1) and executed on one or more processors associated with CPU 104 in conjunction with DSPOS 118 (FIGS. 1 and 2). In the alternative, process 200 may be incorporated into OS 114 (FIG. 1) or a file management system such as FS 116 (FIG. 1).

Process 200 starts in a "Begin Setup Data Storage Power Optimization System (DSPOS)" block 202 and proceeds immediately to a "Retrieve DSPOS Data" block 204. During block 204, process 200 retrieves configuration data (see 162, FIG. 2) that controls the operation of DSPOS 118 (see 230, FIG. 4). As described above in conjunction with FIG. 2, examples of configuration data include, but are not limited to, the selection of various data storage control schemes, a minimum number of disks to keep powered, global inactivity shutoff parameters, schemes to control the timing of moving disks in and out of use and performance parameters for the system as a whole.

During a "Retrieve System Data" block 206, process 200 retrieves information relating to the system on which DSPOS 118 is installed and expected to monitor and control (see 164, FIG. 2), including information that enables DSPOS 118 to determine the number of available data storage devices and whether or not particular devices may be actively controlled in accordance with the claimed subject matter. During an "Identify Active Disk Set Size" block 208, DSPOS 118 determines, by employing information retrieved during blocks 204 and 206, the number of data storage devices that are needed to meet the current performance target and, thus, need to be included in the active set (see 166, FIG. 2). Examples of devices that may be in the active set include, but are not limited to, controller_1 124 (FIG. 1), controller_2 126 (FIG. 1) and data storage devices 131-134 (FIG. 1).

During a "Define Active Set" block 210, process 200 determines based upon the information retrieved during blocks 206 and 208 the number of data storage devices that need to be active to satisfy the current performance target. In addition, process 200 determines whether or not particular data storage devices are required to remain active (see 154, FIG. 2). From this information, process 200 creates a list of active devices, or an "Active Set," that represents the specific list of data storage devices that should be active. During a "Spawn Operate Process (OP.)" block 212, an operate process (see 230, FIG. 4) is initiated. Once the operate process is launched, a notice of this information is optionally transmitted to a system administrator (SA), a log file or both during a "Notify SA" block 214. Typically, a SA or log files are associated with data server 102 but the initiation, resolution of issues and maintenance of DSPOS 118 may also be performed remotely. Finally, process 200 proceeds to an "End Setup DSPOS" block 229 in which process 200 is complete.

FIG. 4 is a flowchart of an Operate DSPOS process 230 corresponding to DSPOS 118 of FIGS. 1 and 2. Like process 200 (FIG. 3), in this example, logic associated with process 230 is stored on DS_1 112 of data server 102 (FIG. 1) and executed on one or more processors associated with CPU 104 in conjunction with DSPOS 118 (FIGS. 1 and 2). In the alternative, process 230 may be incorporated into OS 114 (FIG. 1) or a file management system such as FS 116 (FIG. 1).

Process 230 starts in a "Begin Operate DSPOS" block 232 and proceeds immediately to an "Implement Scheme" block 234. During block 234, process 230 implements the power optimization scheme defined during Setup DSPOS process 200 (FIG. 3). One example of processing that may be associated with block 234 is described in more detail below in conjunction with a Implement Power Optimization Scheme (POS) process 260 of FIG. 5.

During an "Assess Situation" block 236, data server 102, as well as appropriate components of system 100, is evaluated to determine the current situation with respect to the movement of data. Examples of activities that may be evaluated include, but are not limited to, changes in the level of activity of clients, e.g. CS_1 142 and CS_2 144, current system configuration, e.g. network links, disk or disk controllers that are either inoperative or have been added to system 100, workload composition, e.g. ratio of data reads to data writes, and disk space utilization, both inside and outside the active disk set. During a "New AD Set Needed?" block 238, process 230 determines, based upon the assessment of the situation executed during block 236, whether or not the current data storage configuration is acceptable or needs to be modified. If not, control returns to Assess Situation block 236 and processing continues as described above. Of course, some delay may be built into the system so that process 232 is asleep and periodically activated to determine and, if necessary adjust, data storage needs.

If, during block 238, process 230 determines that a new active disk list is required, control proceeds to a "Calculate New Active Disk (AD) Set" block 240. During block 240, process 230 generates a list of data storage devices that should be active, including those that should remain active and those that should be activated (see 154, FIG. 2). It should be noted that in addition to changes in data storage requirements based upon access patterns, the need for a new active disk set may be based upon considerations such as a schedule based upon factors such as ensuring an even distribution of data across all data storage devices and the maximization of disk drive life. In other words, the calculation of an active disk set may depend upon a desire to create uniform data distribution and data storage device duty cycle and based upon both static configuration information and dynamic performance measurements. Once a new active disk list has been generated, control returns to Implement Scheme block 234 and processing continues as described above.

Process 230 is halted by means of an asynchronous interrupt 246, which passes control to a "Cleanup" block 248. During block 248 memory associated with process 230 is freed and any other operations necessary for an orderly shutdown are executed. Interrupt 246 is typically generated when the OS, file system or DSPOS of which processes 230 is a part is itself halted, either explicitly by a system administrator or because of a power down situation. During nominal operation, process 230 continuously loops through the blocks 234, 236, 238 and 240, adjusting the data storage scheme in accordance with the claimed technology. Finally, process 230 is complete during an "End Operate DSPOS" block 249.

Figure 5:
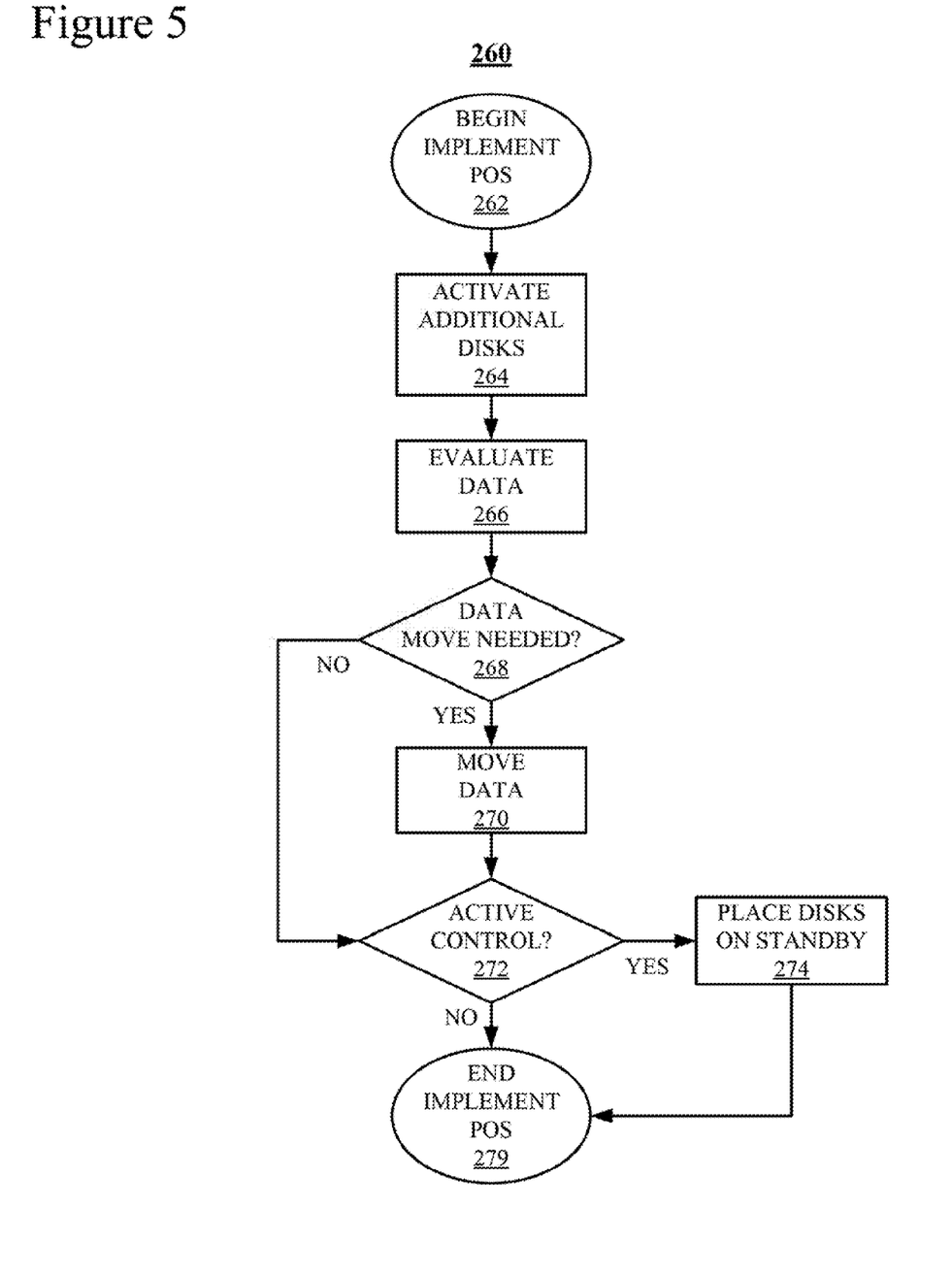
FIG. 5 is a flowchart of an Implement Power Optimization Scheme (POS) process that may implement one aspect of the Operate DSPOS process of FIG. 4.

FIG. 5 is a flowchart of an Implement Power Optimization Scheme (POS) process 260 that may implement one aspect of Operate DSPOS process 230 of FIG. 4. Like processes 200 (FIG. 3) and 230 (FIG. 4), in this example, logic associated with process 260 is stored on DS_1 112 of data server 102 (FIG. 1) and executed on one or more processors associated with CPU 104 in conjunction with DSPOS 118 (FIGS. 1 and 2). In the alternative, process 260 may be incorporated into OS 114 (FIG. 1) or a file management system such as FS 116 (FIG. 1).

Process 260 starts in a "Begin Implement POS" block 262 and proceeds immediately to an "Activate Additional Disks" block 264. During block 264, process 260 activates any data storage devices in the AD set generated during block 240 of process 230 (FIG. 4) that are currently inactive or in a sleep mode. The activation may be effected by an actual command transmitted to the device or the device's controller or simply by an I/O request to the particular device, depending upon the configuration of system 100 and/or the particular device.

During an "Evaluate Data" block 266, process 260 executes an evaluation of data requirements associated with the implementation of the new active disk list (see 156, FIG. 2). During a "Data Move Needed?" block 268, process 260 determines whether the data analysis performed during block 266 indicated that data needs to be moved, whether from an about-to-be deactivated disk to a currently activated one or vice versa. If so, process 260 proceeds to a "Move Data" block 270 during which the targeted data is moved according to the determined needs.

Once data has been moved during block 270 or, if during block 268, process 260 has determined that data does not need to be moved, control proceeds to an "Active Control?" block 272. During block 272, process 260 determines whether or not any particular device, DSPOS 118, data server 102 and system 100 are configured to enable active control of data storage devices. If so, process 260 proceeds to a "Place Disks on Standby" block 274 during which commands are transmitted from DSPOS 118 to any data storage device that is configured for active control and not designated as remaining active, i.e. on the active disk list. In the alternative to active control, which may be implemented on a device-by-device basis if necessary, devices may be deactivated or placed on standby by disk or disk controller inactivity auto-shutoff timers.

Finally, once disks have been placed in a standby mode during block 274 or, if during block 272, process 260 has determined that DSPOS 118 is not configured for active control, control proceeds to an "End Implement POS" block 279 in which process 260 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

I claim:

1. A method, comprising:
    evaluating data throughput of a computing system to generate a data storage requirement, wherein data throughput corresponds to a maximum possible data transmission rate;
    generating, based upon the data storage requirement, an active disk list, wherein a selection of data storage devices of a plurality of data storage devices specified on the active disk list is sufficient to meet the data storage requirement;
    ensuring that each particular data storage device specified in the active disk list is active and that any data storage device not specified on the active disk list is inactive;
    re-evaluating, during operation of the computing system, data throughput of the computing system to generate a modified data storage requirement;
    generating a modified active disk list based upon changed the modified data storage requirement, wherein a modified selection of data storage devices of the plurality of data storage devices specified on the modified active disk list is sufficient to meet the modified data storage requirement; and
    ensuring that each particular data storage device listed on the modified active disk list is active and that any data storage device not listed on the modified active disk list is inactive.

2. The method of claim 1, wherein ensuring that a particular data storage device of the plurality of data storage devices is inactive comprises preventing input/output requests to the particular data storage device.

3. The method of claim 1, wherein ensuring that a particular data storage device of the plurality of data storage devices is inactive comprises transmitting a power-down command to the particular data storage device.

4. The method of claim 1, the evaluating data throughput of the computing system data storage to generate the data storage requirement comprising:
    determining an active disk set size based upon the data throughput; and
    generating the active disk list based upon the active disk set size.

5. The method of claim 1, further comprising, prior to ensuring that a particular currently active data storage device of the plurality of data storage devices not specified on the modified active disk list is inactive, storing data from the currently active data storage device to a data storage device of the plurality of data storage devices specified on the modified active disk list.

6. The method of claim 1, wherein the plurality of data storage devices are disk drives.

7. The method of claim 1, wherein the plurality of data storage devices are data controllers.

8. The method of claim 1, wherein the plurality of data storage devices are disk drives.

9. A method of controlling a data storage device, comprising:
    evaluating data throughput of a computing system to generate a data storage requirement, wherein data throughput corresponds to a maximum possible data transmission rate;

generating, based upon the data storage requirement, an active disk list, wherein a selection of data storage devices of a plurality of data storage devices specified on the active disk list is sufficient to meet the data storage requirement;

ensuring that a particular data storage device of the plurality of data storage devices is active if the particular data storage device is specified in the active disk list;

ensuring that the particular data storage device is inactive if the particular data storage device is not specified on the active disk list;

re-evaluating, during operation of the computing system, data throughput of the computing system to generate a modified data storage requirement;

generating a modified active disk list based upon changed the modified data storage requirement, wherein a modified selection of data storage devices of the plurality of data storage devices specified on the modified active disk list is sufficient to meet the modified data storage requirement;

ensuring that the particular data storage device is inactive if the particular data storage device is not specified on the modified active disk list; and ensuring that each particular data storage device listed on the modified active disk list is active and that any data storage device not listed on the modified active disk list is inactive.

10. The method of claim 9, wherein ensuring that the particular data storage device is inactive comprises preventing input/output requests to the particular data storage device.

11. The method of claim 9, wherein ensuring that the particular data storage device is inactive comprises transmitting a power-down command to the particular data storage device.

12. The method of claim 9, the evaluating data throughput of the computing system data storage to generate the data storage requirement comprising:
  determining an active disk set size based upon the data throughput; and
  generating the active disk list based upon the active disk set size.

13. The method of claim 9, further comprising, prior to ensuring that the particular data storage device is inactive rather than active, storing data from the particular data storage device to a second data storage device of the plurality of data storage devices that is ensured to be active.

14. An apparatus, comprising:
a processor;
a computer-readable physical memory, coupled to the processor;
a plurality of data storage devices; and
logic stored on the computer-readable physical memory for:
  evaluating data throughput of a computing system to generate a data storage requirement, wherein data throughput corresponds to a maximum possible data transmission rate;
  generating, based upon the data storage requirement, an active disk list, wherein a selection of data storage devices of the plurality of data storage devices specified on the active disk list is sufficient to meet the data storage requirement;
  ensuring that each particular data storage device specified in the active disk list is active and that any data storage device not specified on the active disk list is inactive;
  re-evaluating, during operation of the computing system, data throughput of the computing system to generate a modified data storage requirement;
  generating a modified active disk list based upon changed the modified data storage requirement, wherein a modified selection of data storage devices of the plurality of data storage devices specified on the modified active disk list is sufficient to meet the modified data storage requirement; and
  ensuring that each particular data storage device listed on the modified active disk list is active and that any data storage device not listed on the modified active disk list is inactive.

15. The apparatus of claim 14, wherein the logic for ensuring that a particular data storage device of the plurality of data storage devices is inactive comprises logic for preventing inputioutput requests to the particular data storage device.

16. The apparatus of claim 14, wherein the logic for ensuring that a particular data storage device of the plurality of data storage devices is inactive comprises logic for transmitting a power-down command to the particular data storage device.

17. The apparatus of claim 14, the logic for evaluating data throughput of the computing system data storage to generate the data storage requirement comprising logic for:
  determining an active disk set size based upon the data throughput; and
  generating the active disk list based upon the active disk, set size.

18. The apparatus of claim 14, further comprising logic for, prior to ensuring that a particular currently active data storage device of the plurality of data storage devices not specified on the modified active disk list is inactive, storing data from the currently active data storage device to a data storage device of the plurality of data storage devices specified on the modified active disk list.

19. The apparatus of claim 14, wherein the plurality of data storage devices are disk drives.

20. A computer programming product, comprising:
a computer-readable physical memory; and
logic, stored on the computer-readable physical memory for execution on a processor, for:
  evaluating data throughput of a computing system to generate a data storage requirement, wherein data throughput corresponds to a maximum possible data transmission rate;
  generating, based upon the data storage requirement, an active disk list, wherein a selection of data storage devices of a plurality of data storage devices specified on the active disk list is sufficient to meet the data storage requirement;
  ensuring that each particular data storage device specified in the active disk list is active and that any data storage device not specified on the active disk list is inactive;
  re-evaluating, during operation of the computing system, data throughput of the computing system to generate a modified data storage requirement;
  generating a modified active disk list based upon changed the modified data storage requirement, wherein a modified selection of data storage devices of the plurality of data storage devices specified on the modified active disk list is sufficient to meet the modified data storage requirement; and
  ensuring that each particular data storage device listed on the modified active disk list is active and that any data storage device not listed on the modified active disk list is inactive.

21. The computer programming product of claim 20, wherein the logic for ensuring that a particular data storage device of the plurality of data storage devices is inactive comprises logic for preventing input/output requests to the particular data storage device.

22. The computer programming product of claim 20, wherein the logic for ensuring that a particular data storage device of the plurality of data storage devices is inactive comprises logic for transmitting a power-down command to the particular data storage device.

23. The computer programming product of claim 20, the logic for evaluating data throughput of the computing system data storage to generate the data storage requirement comprising logic for:
- determining an active disk set size based upon the data throughput; and
- generating the active disk list based upon the active disk set size.

24. The computer programming product of claim 20, further comprising logic for, prior to ensuring that a particular currently active data storage device of the plurality of data storage devices not specified on the modified active disk list is inactive, storing data from the currently active data storage device to a data storage device of the plurality of data storage devices specified on the modified active disk list.

25. The computer programming product of claim 20, wherein the plurality of data storage devices are disk drives.

* * * * *